United States Patent
Yang et al.

(10) Patent No.: US 9,000,392 B2
(45) Date of Patent: Apr. 7, 2015

(54) CELLULAR THERMAL NEUTRON DETECTOR

(71) Applicants: Nuctech Company Limited, Beijing (CN); Tsinghua University, Beijing (CN)

(72) Inventors: Yigang Yang, Beijing (CN); Hejun Zhou, Beijing (CN); Yi Liu, Beijing (CN); Qinjian Zhang, Beijing (CN); Yongqiang Wang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 30 days.

(21) Appl. No.: 13/726,285

(22) Filed: Dec. 24, 2012

(65) Prior Publication Data
US 2013/0168565 A1  Jul. 4, 2013

(30) Foreign Application Priority Data
Dec. 30, 2011  (CN) .......................... 2011 1 0454387

(51) Int. Cl.
*G01T 3/00* (2006.01)

(52) U.S. Cl.
CPC .. *G01T 3/00* (2013.01); *G01T 3/008* (2013.01)

(58) Field of Classification Search
CPC ................................ G01T 3/008; G01T 3/00
USPC ...................................................... 250/390.1
See application file for complete search history.

(56) References Cited

U.S. PATENT DOCUMENTS

| | | | |
|---|---|---|---|
| 7,964,852 B2 * | 6/2011 | McCormick | 250/391 |
| 2003/0150999 A1 * | 8/2003 | Buffet et al. | 250/385.1 |
| 2003/0201394 A1 * | 10/2003 | Peoples | 250/336.1 |
| 2005/0205798 A1 * | 9/2005 | Downing et al. | 250/390.11 |
| 2010/0258734 A1 | 10/2010 | McCormick et al. | |

FOREIGN PATENT DOCUMENTS

CN   202614948   12/2012

OTHER PUBLICATIONS

Second Office Action mailed Sep. 11, 2013, CN Patent Application No. 201110454387.4.
Petrillo, C., et al., "A honeycomb collimator for the neutron Brillouin scattering spectrometer BRISP," Nuclear Instruments and Methods in Physics Research A 489 (2002) 304-312.

* cited by examiner

*Primary Examiner* — Marcus Taningco
(74) *Attorney, Agent, or Firm* — Casimir Jones S.C.

(57) ABSTRACT

The present invention provides a cellular thermal neutron detector, comprising: a cellular structure comprised of one or more hollow regular hexagonal prism-shaped cellular units, wherein a neutron absorbing material is coated on an inner side of a pipe wall of each of the cellular units. Since the neutron-sensitive cellular structure is employed, the present invention can perform thermal neutron detection without using the scarce nuclide 3He, and effectively reduce the manufacture costs of the thermal neutron detector. Further, the present invention has characteristics such as a reduced or eliminated neutron detecting dead zone.

15 Claims, 3 Drawing Sheets

CELLULAR THERMAL NEUTRON DETECTOR

CROSS-REFERENCE TO RELATED APPLICATION

The present application claims priority to pending Chinese Patent Application No. CN201110454387.4, filed Dec. 30, 2011, the contents of which are incorporated by reference its entirety.

FIELD OF THE INVENTION

The present invention generally relates to application of nuclear technologies, and particularly to neutron scattering and security detection technologies. More particularly, the present invention relates to a thermal neutron detector.

BACKGROUND OF THE INVENTION

In traditional safety detection technologies for nuclear materials, it is a common technology to use $^3$He proportional counters for thermal neutron detection. However, due to scarcity of $^3$He gas, the thermal neutron detector used for neutron scattering and security detection is confronted with a large problem in respect of costs of use. In order to solve the so-called "$^3$He supply crisis" problem, those skilled in the art are developing novel neutron detectors in place of traditional $^3$He proportional counters.

As known in the art, the thermal neutron measurement is based on some particular nuclear reactions. Nuclear reaction for thermal neutron measurement usually should have the following two basic characteristics:

there is a large nuclear reaction cross section to allow for a high thermal neutron absorbing efficiency $P_1$;

high-energy charged particles should be produced, and a production probability $P_2$ of the high-energy charged particles should be large, because only such high-energy charged particles can produce effective ionization and form useable signals in the subsequent procedure.

With regard to a final detecting efficiency P, a probability $P_3$ of the charged particles entering a signal-forming volume of the detector and forming the signal should be also considered. Finally, the detecting efficiency P can be determined by the following equation:

$$P = P_1 \times P_2 \times P_3$$

wherein the thermal neutron absorbing efficiency $P_1$ and the high-energy charged particle producing probability $P_2$ depend on types of nuclides used by the detector, and the probability $P_3$ of the charged particles entering the signal-forming volume of the detector and forming the signal is decided by the design characteristics of the detector. Nuclides with larger $P_1$ and $P_2$ are generally $^3$He, $^6$Li, $^{10}$B, $^{155}$Gd and $^{157}$Gd. In view of such issues as nuclide section and actual applicability, $^{10}$B, $^{155}$Gd and $^{157}$Gd are popular nuclides in the art attracting more concerns. It is important issues in the art to effectively use these nuclides and design a reasonable detector structure to replace the traditional $^3$He proportional counter. To this end, the prior art provides detectors with different structures, such as boron-coated straw tube detectors and multigrid detectors.

SUMMARY OF THE INVENTION

An object of the present invention is to provide a novel technical solution for thermal neutron detection without using scarce nuclide $^3$He, so as to reduce manufacturing costs.

A further object of the present invention is to enable the technical solution of the present invention to have characteristics such as reduced or eliminated neutron detection dead zone, simple processing process and/or a low γ sensitivity as compared with the prior art.

In particular, the present invention provides a thermal neutron detector, comprising: a cellular structure comprised of one or more hollow regular hexagonal prism-shaped cellular units, wherein a neutron absorbing material is coated on an inner side of a pipe wall of each of the cellular units.

Preferably, the pipe wall of each cellular unit is electrically grounded; an anode wire is provided along a central axis of each of the cellular units; and a chamber of each of the cellular units is filled with a proportional working gas.

Preferably, the thermal neutron detector further comprises: a supporting frame surrounding a radial outer side of the cellular structure; and a first template and a second template respectively having a central opening and being fixed on the supporting frame in a way of adjoining or being adjacent to either end of the cellular structure.

Preferably, the cellular structure is connected to the supporting frame via a plurality of groups of springs evenly distributed along a envelope circumferential line of the cellular structure, to maintain spatial stability of the cellular structure, wherein each group of springs are comprised of at least two springs spaced apart from each other along a longitudinal axis of the supporting frame.

Preferably, the central opening is comprised of one regular hexagonal hole or a plurality of regular hexagonal holes which are adjoined and communicated with one another, the anode wire extending along the central axis of each cellular unit passes through a center of the corresponding regular hexagonal hole of the central opening of the first template and the second template and is connected to an electrical connecting device fixed relative to the first template and the second template.

Preferably, a range of pressure of the proportional working gas is 0.1-10 atmospheric pressures.

Preferably, the pipe wall of the cellular unit is made of aluminum, copper or stainless steel.

Preferably, the thickness of the neutron absorbing material coated on the inner side of the pipe wall of the cellular unit is in a range of 0.1 μm-4 μm.

Preferably, the neutron absorbing material is a boron-containing or gadolinium-containing material.

Preferably, each of the cellular units has an axial length of 10 cm-100 cm and a side length of 2 mm-5 mm.

In the thermal neutron detector according to the present invention, the neutron-sensitive cellular structure is employed, so that the present invention can perform thermal neutron detection without using the scarce nuclide $^3$He, and effectively reduce the manufacture costs of the thermal neutron detector. Further, the regular hexagonal prism-shaped cellular units can be seamlessly arranged together to constitute a complete cellular structure so that the present invention has characteristics such as a reduced or eliminated neutron detecting dead zone as compared with the prior art.

From the following detailed description of preferred embodiments of the present invention with reference to the drawings, those skilled in the art can better understand the above and other objects, advantages and features of the present invention.

BRIEF DESCRIPTION OF DRAWINGS

Preferred embodiments of the present invention will be described in detail hereafter with reference to the drawings by way of example, but not limitation. Like reference numbers throughout the drawings refer to the like or similar parts or portions. Those skilled in the art should appreciate that these drawings are not necessarily drawn to scale. In the drawings.

DETAILED DESCRIPTION OF PREFERRED EMBODIMENTS

Figure 1:
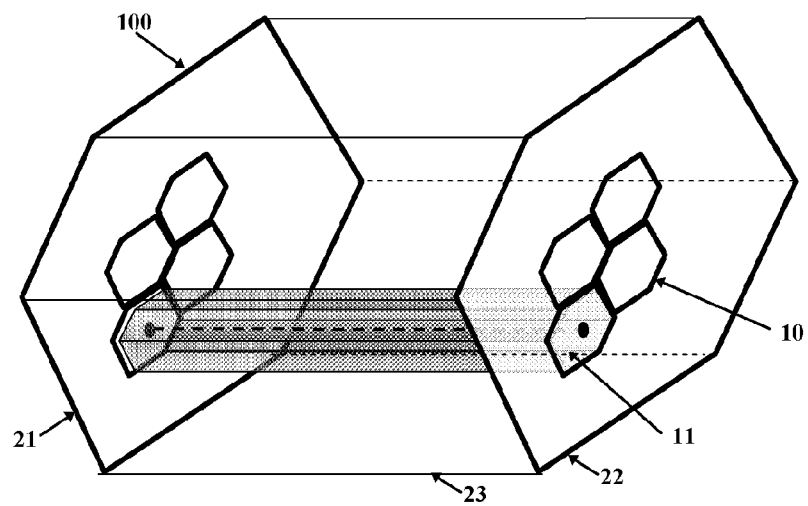
FIG. 1 is a schematic perspective view of a cellular thermal neutron detector according to a preferred embodiment of the present invention.

FIG. 1 is a schematic perspective view of a cellular thermal neutron detector 100 according to a preferred embodiment of the present invention. The thermal neutron detector 100 comprises a cellular structure 10 which is formed by arranging one or more (e.g., two, three, four, six, eight, sixteen or more) hollow regular hexagonal prism-shaped cellular units 11.

Figure 2:
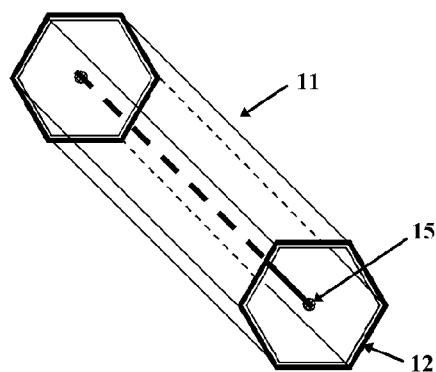
FIG. 2 is a schematic perspective view of a cellular unit in the cellular thermal neutron detector shown in FIG. 1.
Figure 3:
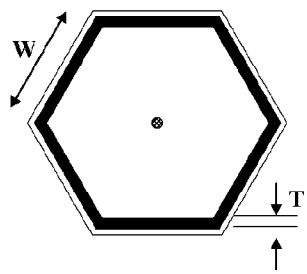
FIG. 3 is a schematic end view of the cellular unit shown in FIG. 2.
Figure 4:
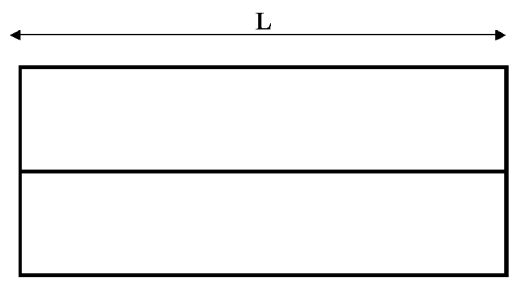
FIG. 4 is a schematic side view of the cellular unit shown in FIG. 2.

FIG. 2 illustrates an individual cellular unit 11. The axial length of the cellular unit 11 may be specifically selected according to needs in practical applications. As shown in FIGS. 3-4, a typical value of the axial length L of the cellular unit 11 may be 10 cm-100 cm, and a typical value of the side length W may be 2 mm-5 mm.

A pipe wall 12 of the cellular unit 11 may be constructed of a suitable meal such as aluminum foil, copper foil or stainless steel foil of a certain thickness. In a preferred embodiment of the present invention, the pipe wall 12 of the cellular unit 11 is made of aluminum foil. Regarding the aluminum foil for serving as the pipe wall of the cellular unit, the thickness of the aluminum foil is preferably as small as possible to reduce γ sensitivity on the premise of meeting the structural rigidity, and the typical thickness, for example, may be 25 μm-100 μm.

Figure 5:
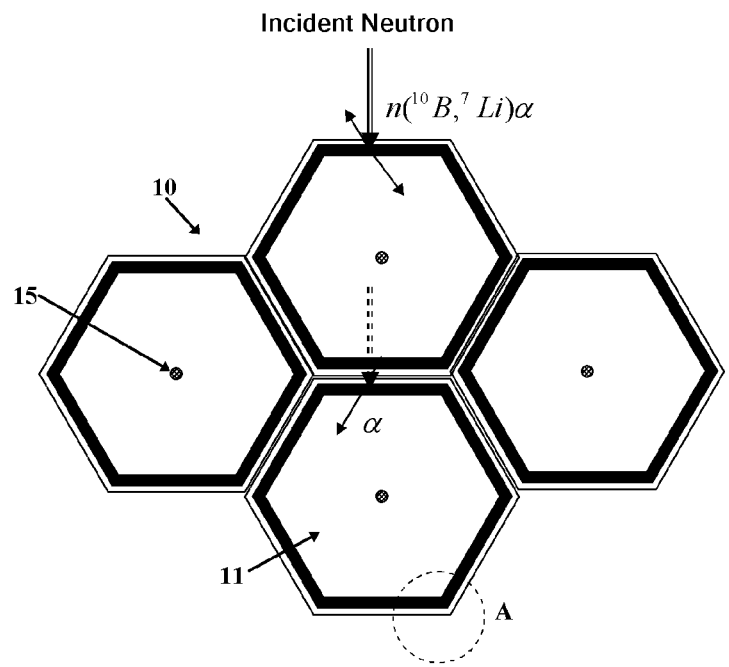
FIG. 5 schematically illustrates a procedure in which neutrons are subjected to a (m, α) reaction with $^{10}B$ adhered on a pipe wall when incident neutrons are incident to a cellular structure in the cellular thermal neutron detector shown in FIG. 1.
Figure 6:
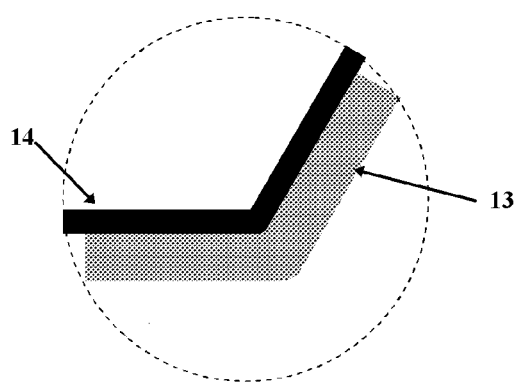
FIG. 6 is a schematic partially-enlarged view of area A in FIG. 5.

A neutron absorbing material (or called neutron-sensitive material) is coated on an inner side of the pipe wall 12 of each cellular unit 11. In the embodiment shown in FIGS. 5-6, an aluminum foil substrate 13 constitutes the pipe wall 12 of the cellular unit; the neutron absorbing material 14 (which is a boron-containing material in this example) with a certain thickness is adhered on the aluminum foil substrate 13. The thickness T of the neutron absorbing material 14 cannot be too small or too large, and 0.5 μm-2 μm is a preferable range of thickness. In the embodiment shown in FIG. 5 in which $^{10}B$ in the boron-containing material is a neutron-sensitive nuclide, when the thermal neutrons are incident on the cellular structure 10, the incident neutrons are subjected to a (m, α) reaction with $^{10}B$ adhered on the pipe wall 12; α particles or $^{7}Li$ obtained from the reaction is likely to penetrate through the boron-containing material into an internal chamber of each cellular unit 11 filled with a proportional working gas, wherein the proportional working gas may be for example Ar90%+$CO_2$10% gas which pressure may preferably be set to be large enough to absorb all of the nuclear energy of α particles or $^{7}Li$ entering the gas. A range of gas pressure of the proportional working gas may be 0.1-10 atmospheric pressures, typically 0.5-2 atmospheric pressures. Besides the boron-containing material, a gadolinium-containing material (e.g., a gadolinium foil or a $Gd_2O_3$ film) may be used as the neutron absorbing material in other embodiments of the present invention.

An anode wire 15 is provided along a central axis of each cellular unit 11. In operation, these anode wires all are applied a positive DC high voltage which together with a ground potential applied on the pipe wall 12 forms a radial electric field within the cellular unit 11. The positive DC high voltage applied on the anode wires may be selected so that a local space around each anode wire 15 forms a strong electric field sufficient for occurrence of an avalanche effect such that the detector is in a proportional working mode. As appreciated by those skilled in the art, a specific magnitude of the voltage applied to the anode wires is preferably determined by the side length W of the cellular unit 11, the type of the filled proportional working gas and the magnitude of gas pressure.

According to a preferred embodiment of the present invention, during preparing the cellular structure 10, firstly a metal foil coated with the neutron absorbing material 14, e.g., an aluminum foil coated with $B_4C$, is obtained by a process such as electron beam evaporation or magnetron sputtering; then the metal foil coated with the neutron absorbing material 14 is manufactured as a unitary cellular structure 10 including one or more cellular units 11 by a honeycomb forming process. Such processes for forming the cellular structure by using various foil materials or sheet materials are very mature in the prior art of forming technologies and can be easily implemented by those skilled in the art, and then this will not be unnecessarily described in detail herein.

Figure 7:
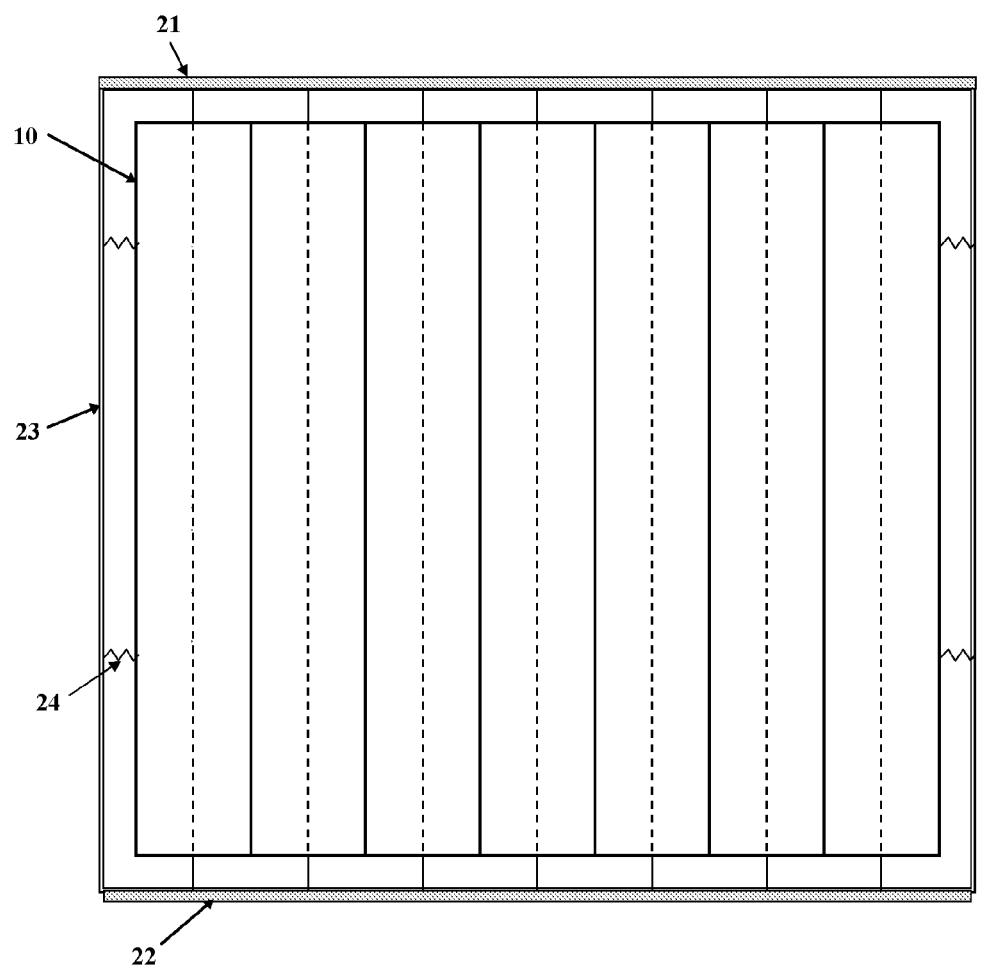
FIG. 7 schematically illustrates a supporting and fixing manner of the cellular structure according to a preferred embodiment of the present invention.

After the cellular structure 10 sensitive to neutrons is prepared, considering that the pipe wall 12 (such as an aluminum foil) has a small thickness, the present invention particularly provides a template and a supporting frame to reinforce the rigidity of the whole neutron detector 100. As shown in FIG. 7, a first template 21, a second template 22 and a supporting frame 23 provide rigid support and protection for the whole cellular structure 10. Specifically, the supporting frame 23 surrounds a radial outer side of the cellular structure 10; the first template 21 and the second template 22 having a central opening are respectively fixed on the supporting frame 23 in a way of adjoining or being adjacent to either end of the cellular structure 10. The central openings of the first template 21 and the second template 22 are both comprised of one regular hexagonal hole or a plurality of regular hexagonal holes which are adjoined and communicated with one another. Preferably, the number of regular hexagonal holes constituting the central opening is identical with the number of the cellular units included by the cellular structure, and each regular hexagonal hole constituting the central opening is concentric with the central axis of the corresponding cellular unit. The anode wire 15 of each cellular unit passes through a center of the corresponding regular hexagonal hole of the central opening of the first template 21 and the second template 22 and is connected to an electrical connecting device (not shown) fixed relative to the first template 21 and the second template 22. The electrical connecting device is for example an electrical connection terminal or electrical connection grille operably connected to an external DC high voltage power source, which is easily implemented by those skilled in the art and then will not be unnecessarily described in detail herein. Therefore, the anode wire 15 passing through the cellular unit 11 may be considered to be connected at the center of the corresponding regular hexagonal holes of the two templates.

In a preferred embodiment of the present invention, the cellular structure 10 is wholly connected to the supporting frame 23 by a plurality of groups of springs 24 evenly distributed along an envelope circumferential line of the cellular structure, to maintain spatial stability of the cellular structure 10. Preferably, each group of springs may be comprised of at least two springs spaced apart from each other along a longitudinal axis of the supporting frame 23. The pipe wall per se of each cellular unit 11 is at a ground potential and functions as a cathode. Specifically, the pipe wall 12 is connected to the supporting frame 23 via the springs 14 and then is electrically grounded.

A circuit portion (such as, a specific grounding method, an amplifier circuit, an external DC high voltage power source, and so on) and an air charging and discharging device and a sealing device of the detector 100 are similar to those of for example boron-coated straw tube neutron detector or a traditional single-wire proportion chamber and can be readily implemented by those skilled in the art, and then this will not be unnecessarily described in detail herein.

So far, those skilled in the art can appreciate that although exemplary preferred embodiments have been illustrated and described in detail, many other variations or modifications conforming to the principles of the present invention can be directly determined or derived from the disclosure of the present application without departing from the spirit and scope of the present invention. Therefore, the scope of the present invention shall be understood and recognized as covering all of these other variations or modifications.

What is claimed is:

1. A thermal neutron detector comprising:
   a cellular structure comprised of one or more hollow regular hexagonal prism-shaped cellular units, wherein a neutron absorbing material is coated on an inner side of a pipe wall of each of the cellular units,
   wherein the pipe wall of each of the cellular units is electrically grounded;
   an anode wire is provided along a central axis of each of the cellular units;
   a chamber of each of the cellular units is filled with a proportional working gas;
   a supporting frame surrounding a radial outer side of the cellular structure;
   a first template and a second template respectively having a central opening and being fixed on the supporting frame in a way of adjoining or being adjacent to either end of the cellular structure,
   wherein the cellular structure is connected to the supporting frame via a plurality of groups of springs evenly distributed along an envelope circumferential line of the cellular structure, to maintain spatial stability of the cellular structure, wherein each group of springs are comprised of at least two springs spaced apart from each other along a longitudinal axis of the supporting frame.

2. The thermal neutron detector according to claim 1, wherein the central opening is comprised of one regular hexagonal hole or a plurality of regular hexagonal holes which are adjoined and communicated with one another, the anode wire extending along the central axis of each cellular unit passes through a center of the corresponding regular hexagonal hole of the central opening of the first template and the second template and is connected to an electrical connecting device fixed relative to the first template and the second template.

3. The thermal neutron detector according to claim 1, wherein a range of pressure of a proportional working gas is 0.1-10 atmospheric pressures.

4. The thermal neutron detector according to claim 1, wherein the pipe wall of the cellular unit is made of aluminum, copper or stainless steel.

5. The thermal neutron detector according to claim 1, wherein the thickness of the neutron absorbing material coated on the inner side of the cellular unit is in a range of 0.1 µm-4 µm.

6. The thermal neutron detector according to claim 1, wherein the neutron absorbing material is a boron-containing or gadolinium-containing material.

7. The thermal neutron detector according to claim 1, wherein each of the cellular units has an axial length of 10 cm-100 cm and a side length of 2 mm-5 mm.

8. The thermal neutron detector according to claim 1, wherein a range of pressure of a proportional working gas is 0.1-10 atmospheric pressures.

9. The thermal neutron detector according to claim 1, wherein the pipe wall of the cellular unit is made of aluminum, copper or stainless steel.

10. The thermal neutron detector according to claim 1, wherein the thickness of the neutron absorbing material coated on the inner side of the cellular unit is in a range of 0.1 µm-4 µm.

11. The thermal neutron detector according to claim 1, wherein the neutron absorbing material is a boron-containing or gadolinium-containing material.

12. The thermal neutron detector according to claim 1, wherein each of the cellular units has an axial length of 10 cm-100 cm and a side length of 2 mm-5 mm.

13. A thermal neutron detector comprising:
    a cellular structure comprised of one or more hollow regular hexagonal prism-shaped cellular units, wherein a neutron absorbing material is coated on an inner side of a pipe wall of each of the cellular units,
    wherein the pipe wall of each of the cellular units is electrically grounded;
    an anode wire is provided along a central axis of each of the cellular units;
    a chamber of each of the cellular units is filled with a proportional working gas;
    a supporting frame surrounding a radial outer side of the cellular structure; and
    a first template and a second template respectively having a central opening and being fixed on the supporting frame in a way of adjoining or being adjacent to either end of the cellular structure, wherein the cellular structure is positioned such that it is encompassed inbetween the first template and the second template.

14. The thermal neutron detector according to claim 13, wherein the cellular structure is connected to the supporting frame via a plurality of groups of springs evenly distributed along an envelope circumferential line of the cellular structure, to maintain spatial stability of the cellular structure, wherein each group of springs are comprised of at least two springs spaced apart from each other along a longitudinal axis of the supporting frame.

15. The thermal neutron detector according to claim 13, wherein the central opening is comprised of one regular hexagonal hole or a plurality of regular hexagonal holes which are adjoined and communicated with one another, the anode wire extending along the central axis of each cellular unit passes through a center of the corresponding regular hexagonal hole of the central opening of the first template and the second template and is connected to an electrical connecting device fixed relative to the first template and the second template.

<div align="center">* * * * *</div>